United States Patent
Berke et al.

(10) Patent No.: US 10,872,132 B2
(45) Date of Patent: Dec. 22, 2020

(54) SYSTEMS AND METHODS FOR DISTINGUISHING INFORMATION HANDLING SYSTEM PROVIDER-SUPPORTED INFORMATION HANDLING RESOURCE VIA SYSTEM LICENSE

(71) Applicant: Dell Products L.P., Round Rock, TX (US)

(72) Inventors: Stuart Allen Berke, Austin, TX (US); Mukund Purshottam Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1408 days.

(21) Appl. No.: 14/304,276

(22) Filed: Jun. 13, 2014

(65) Prior Publication Data

US 2015/0363712 A1 Dec. 17, 2015

(51) Int. Cl.
*G06F 21/10* (2013.01)
*G06F 21/12* (2013.01)
*G06Q 10/06* (2012.01)

(52) U.S. Cl.
CPC .......... *G06F 21/105* (2013.01); *G06F 21/121* (2013.01); *G06Q 10/0631* (2013.01)

(58) Field of Classification Search
CPC . G06Q 10/0631; G06F 21/105; G06F 21/572; G11B 20/0055
See application file for complete search history.

(56) References Cited

U.S. PATENT DOCUMENTS

| | | | | |
|---|---|---|---|---|
| 7,526,785 | B1 * | 4/2009 | Pearson | G06F 21/57 725/31 |
| 7,761,591 | B2 * | 7/2010 | Graham | G06Q 40/02 709/233 |
| 8,713,683 | B2 * | 4/2014 | Moore | G06F 21/572 726/25 |
| 9,021,597 | B2 * | 4/2015 | Moore | G06F 21/572 726/25 |
| 9,141,802 | B2 * | 9/2015 | Yao | G06F 21/575 |
| 9,336,395 | B2 * | 5/2016 | Berlin | G06F 21/575 |
| 9,589,138 | B2 * | 3/2017 | Yao | G06F 21/572 |
| 2004/0193545 | A1 * | 9/2004 | Shlasky | G06F 21/125 705/59 |

(Continued)

*Primary Examiner* — Tyler W Knox
(74) *Attorney, Agent, or Firm* — Jackson Walker L.L.P.

(57) ABSTRACT

In accordance with embodiments of the present disclosure, an information handling system comprising a processor, at least one information handling resource communicatively coupled to the processor, and a BIOS comprising a program of instructions executable by the processor and configured to cause the processor to initialize one or more information handling resources of the information handling system. The BIOS may be configured to record information regarding the at least one information handling resource, compare the information to a license for the information handling system to determine if the at least one information handling resource is supported by a provider of the information handling system, and responsive to determining that the information handling system is unsupported by the provider, initiate a remedial action with respect to at least one information handling resource.

21 Claims, 4 Drawing Sheets

(56) References Cited

U.S. PATENT DOCUMENTS

| | | | |
|---|---|---|---|
| 2005/0132347 A1* | 6/2005 | Harper | G06F 21/105 717/168 |
| 2005/0289072 A1* | 12/2005 | Sabharwal | G06F 21/121 705/59 |
| 2006/0107329 A1* | 5/2006 | Frank | G06F 21/74 726/26 |
| 2006/0293942 A1* | 12/2006 | Chaddha | G06Q 10/0631 705/7.12 |
| 2007/0143462 A1* | 6/2007 | Venkatachalam | G06F 21/554 709/223 |
| 2007/0174144 A1* | 7/2007 | Borders | G06Q 10/087 705/26.81 |
| 2008/0256349 A1* | 10/2008 | Dennis | G06F 21/128 713/1 |
| 2009/0259834 A1* | 10/2009 | Ramos | G06F 8/63 713/1 |
| 2010/0191800 A1* | 7/2010 | Jaber | G06F 21/105 709/203 |
| 2010/0228679 A1* | 9/2010 | Scapa | G06F 21/105 705/310 |
| 2010/0229233 A1* | 9/2010 | Broyles | G06F 21/105 726/10 |
| 2011/0023031 A1* | 1/2011 | Bonola | G06F 11/3664 718/1 |
| 2011/0047624 A1* | 2/2011 | Vedantam | G06F 21/10 726/26 |
| 2012/0102498 A1* | 4/2012 | Subramanya | G06Q 10/109 718/104 |
| 2012/0206447 A1* | 8/2012 | Hutchins | G06T 15/005 345/419 |
| 2012/0233706 A1* | 9/2012 | O'Connor | G06F 21/10 726/30 |
| 2013/0014221 A1* | 1/2013 | Moore | G06F 21/85 726/3 |
| 2013/0111197 A1* | 5/2013 | Nadon | G06F 9/451 713/1 |
| 2013/0139245 A1* | 5/2013 | Thomas | H04L 63/1441 726/13 |
| 2013/0173328 A1* | 7/2013 | Griner | G06Q 10/0631 705/7.24 |
| 2013/0176865 A1* | 7/2013 | Boland | H04L 51/12 370/252 |
| 2013/0179978 A1* | 7/2013 | Pistoia | G06F 21/50 726/25 |
| 2014/0047193 A1* | 2/2014 | Gross | G06F 12/0893 711/144 |
| 2014/0089651 A1* | 3/2014 | Yao | H04L 63/0853 713/2 |
| 2014/0089726 A1* | 3/2014 | Warnes | G06F 11/1008 714/6.1 |
| 2014/0215196 A1* | 7/2014 | Berlin | G06F 21/572 713/2 |
| 2014/0215637 A1* | 7/2014 | Moore | G06F 21/57 726/27 |
| 2015/0074815 A1* | 3/2015 | Huscroft | G06F 21/12 726/26 |
| 2015/0363712 A1* | 12/2015 | Berke | G06Q 10/0631 705/7.12 |
| 2016/0110546 A1* | 4/2016 | Yao | G06F 21/572 713/176 |

* cited by examiner

SYSTEMS AND METHODS FOR DISTINGUISHING INFORMATION HANDLING SYSTEM PROVIDER-SUPPORTED INFORMATION HANDLING RESOURCE VIA SYSTEM LICENSE

TECHNICAL FIELD

The present disclosure relates in general to information handling systems, and more particularly to distinguishing, via a system license, information handling resources that are supported by a provider (e.g., manufacturer, vendor, etc.) of an information handling system from unsupported information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A provider of an information handling system (e.g., a manufacturer, vendor, seller, or other provider) may expend significant amounts of time and financial resources to develop, test, and validate information handling resources that are installed in an information handling system, in order to ensure compatibility and robustness of operation. However, some customers of information handling systems may choose (e.g., to save on cost) to install information handling resources which are not validated or supported by the provider of the information handling system. Such unsupported information handling resources may cause instabilities in an information handling system, or may lack robustness required to utilize advanced capabilities of an information handling system. Such unsupported information handling resources may also increase system warranty costs.

SUMMARY

In accordance with the teachings of the present disclosure, the disadvantages and problems associated with distinguishing among supported and unsupported information handling resources in an information handling system may be reduced or eliminated.

In accordance with embodiments of the present disclosure, an information handling system comprising a processor, at least one information handling resource communicatively coupled to the processor, and a BIOS comprising a program of instructions executable by the processor and configured to cause the processor to initialize one or more information handling resources of the information handling system. The BIOS may be configured to record information regarding the at least one information handling resource, compare the information to a license for the information handling system to determine if the at least one information handling resource is supported by a provider of the information handling system, and responsive to determining that the information handling system is unsupported by the provider, initiate a remedial action with respect to at least one information handling resource.

In accordance with these and other embodiments of the present disclosure, a method may include recording information regarding at least one information handling resource present in an information handling system, comparing the information to a license for the information handling system to determine if the at least one information handling resource is supported by a provider of the information handling system, and responsive to determining that the information handling system is unsupported by the provider, initiating a remedial action with respect to at least one information handling resource.

In accordance with these and other embodiments of the present disclosure, an article of manufacture may include a computer readable medium and computer-executable instructions carried on the computer readable medium. The instructions may be readable by a processor, the instructions, when read and executed, for causing the processor to record information regarding at least one information handling resource present in an information handling system, compare the information to a license for the information handling system to determine if the at least one information handling resource is supported by a provider of the information handling system, and responsive to determining that the information handling system is unsupported by the provider, initiate a remedial action with respect to at least one information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

Figure 1:
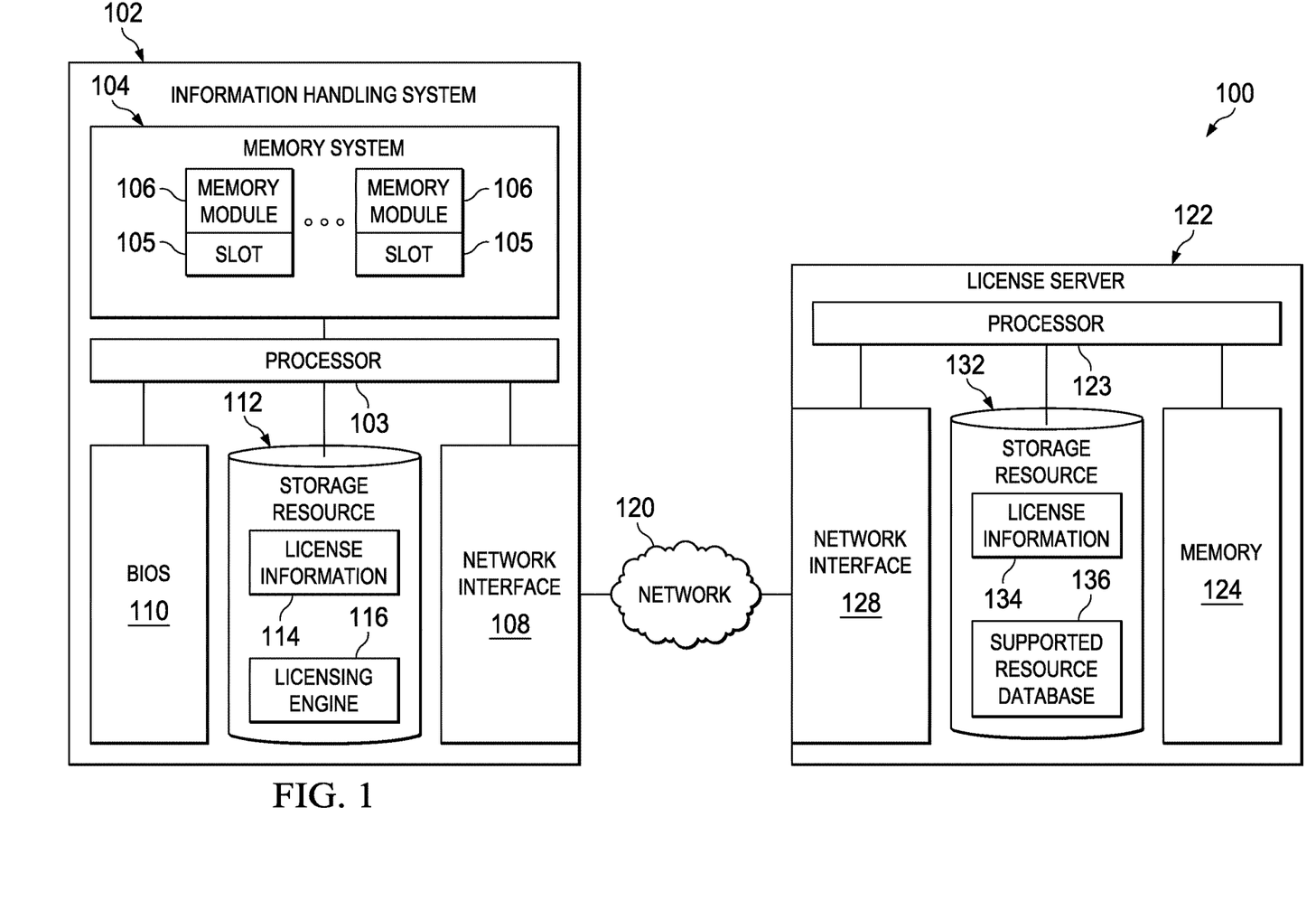
FIG. 1 illustrates a block diagram of an example system for distinguishing information handling system provider-supported information handling resources using an information handling system license, in accordance with embodiments of the present disclosure.

FIG. 1 illustrates a block diagram of an example system 100 for distinguishing information handling system provider-supported information handling resources using an information handling system license, in accordance with embodiments of the present disclosure. As shown in FIG. 1, system 100 may include information handling system 102, a license server 122, and a network 120 communicatively coupling license server 122 to information handling system 102.

In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory system 104 communicatively coupled to processor 103, a network interface 108 communicatively coupled to processor 103, a basic input/output system (BIOS) 110 communicatively coupled to processor 103, and a storage resource 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory system 104, BIOS 110, and/or another component of information handling system 102.

Memory system 104 may be communicatively coupled to processor 103 and may include any system, device, or apparatus configured to retain program instructions and/or data for a period of time (e.g., computer-readable media). Memory system 104 may include RAM, EEPROM, a PCM-CIA card, flash memory, magnetic storage, opto-magnetic storage, or any suitable selection and/or array of volatile or non-volatile memory that retains data after power to information handling system 102 is turned off.

As shown in FIG. 1, memory system 104 may comprise a plurality of memory slots 105, each configured to receive a corresponding memory module 106. A memory slot 105 may include any system, device, or apparatus configured to receive a memory module 106 in order to electrically couple such memory module 106 to processor 103. Each memory module 106 may include any system, device or apparatus configured to retain program instructions and/or data for a period of time (e.g., computer-readable media). Each memory module 106 may include a dynamic random access memory (DRAM) module (e.g., a dual in-line package (DIP) memory, a Single In-line Pin Package (SIPP) memory, a Single-Inline Memory Module (SIMM), a Dual-Inline Memory Module (DIMM), a Ball Grid Array (BGA)), or any other suitable memory.

Network interface 108 may comprise any suitable system, apparatus, or device operable to serve as an interface between information handling system 102 and license server 122 and/or other information handling systems. Network interface 108 may enable information handling system 102 to communicate using any suitable transmission protocol and/or standard, including without limitation, all transmission protocols and/or standards enumerated below with respect to the discussion of network 120. In these and other embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory system 104) may be executed by processor 103 and given control of information handling system 102.

Storage resource 112 may include a system, device, or apparatus configured to store data. Storage resource 112 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 112 may include one or more storage enclosures configured to hold and/or power one or more of such devices. In the embodiments represented by FIG. 1, storage resource 112 may reside within information handling system 102. However, in other embodiments, storage resource 112 may reside external to information handling system 102 (e.g., may be coupled to information handling system 102 via network 120).

As shown in FIG. 1, storage resource 112 may have stored thereon license information 114. License information 114 may include a table, list, map, database, or other data structure which sets forth licenses or entitlements of information handling system 102 to digital assets (e.g., software applications, a deliverable or performable service, music, video, software activation keys, personalization instructions, files, etc.) and/or to information handling resources. To avoid circumventing the methods and systems disclosed herein for distinguishing provider-supported information handling resources from unsupported information handling resources, license information 114 may be encrypted or otherwise secured from tampering by unauthorized parties.

In addition, storage resource 112 may have stored thereon a licensing engine 116. As described in greater detail elsewhere in this disclosure, licensing engine 116 may include any system, device, or apparatus configured to, as described in greater detail elsewhere in this disclosure, perform licensing operations on an information handling system 102, including generation of license information 114 and verification of information handling resources with respect to license information 114. In some embodiments, licensing engine 116 may be implemented as a program of instructions that may be read by and executed on processor 103 to carry out the functionality of licensing engine 116. Although FIG. 1 depicts licensing engine 116 present on storage resource 112, in some embodiments, all or a portion of licensing engine 116 may be stored as part of BIOS 110.

In addition to processor 103, memory system 104, network interface 108, BIOS 110, and storage resource 112, information handling system 102 may include one or more other information handling resources.

Network 120 may be a network and/or fabric configured to couple license server 122 and information handling system 102 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In some embodiments, license server 122 may be a server. In other embodiments, license server 122 may be a personal computer (e.g., a desktop computer or a portable computer). As depicted in FIG. 1, license server 122 may include a processor 123, a memory 124 communicatively coupled to processor 123, a network interface 128 communicatively coupled to processor 123, and a storage resource 132 communicatively coupled to processor 123.

Processor 123 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of license server 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to license server 122 is turned off.

Network interface 128 may comprise any suitable system, apparatus, or device operable to serve as an interface between license server 122 and network 120. Network interface 128 may enable license server 122 to communicate using any suitable transmission protocol and/or standard, including any of the protocols and/or standards described above with respect to network 120. In these and other embodiments, network interface 128 may comprise a NIC.

Storage resource 132 may include a system, device, or apparatus configured to store data. Storage resource 132 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 132 may include one or more storage enclosures configured to hold and/or power one or more of such devices. In the embodiments represented by FIG. 1, storage resource 132 may reside within license server 122. However, in other embodiments, storage resource 132 may reside external to license server 122 (e.g., may be coupled to license server 122 via network 120).

As shown in FIG. 1, storage resource 132 may have stored thereon license information 134. License information 134 may include a table, list, map, database, or other data structure which sets forth licenses or entitlements of various information handling systems communicatively coupled to license server 122 (e.g., including information handling system 102) to digital assets (e.g., software applications, a deliverable or performable service, music, video, software activation keys, personalization instructions, files, etc.) and/or to information handling resources. To avoid circumventing the methods and systems disclosed herein for distinguishing provider-supported information handling resources from unsupported information handling resources, license information 134 may be encrypted or otherwise secured from tampering by unauthorized parties.

In addition, storage resource 132 may have stored thereon supported resource database 136. Supported resource database may include a table, list, map, database, or other data structure which sets forth memory modules 106 and/or other information handling resources which may be supported by information handling system 102 and/or other information handling systems.

Thus, license server 122 may serve as a central vault or repository for numerous information handling systems. License server 122 may be maintained by a provider of information handling systems, an enterprise administrator of numerous information handling systems, or in any other suitable manner.

In addition to processor 123, memory 124, network interface 128, and storage resource 132, license server 122 may include one or more other information handling resources.

In operation, during manufacturing of information handling system 102 (e.g., during factory configuration and testing), information handling system 102 may record information regarding information handling resources (e.g., memory system 104) installed in information handling system 102 which are validated during such configuration and testing, and store that information in a per-system license for information handling system 102, which may be maintained in license information 114 of information handling system 102 or in license information 134 of license server 122. Subsequently, after information handling system 102 has been provided to its end user, the information handling system 102 may periodically (e.g., during each boot or initialization of information handling system 102) inventory information handling resources (e.g., memory modules 106) subject to licensing and compare such inventory against the relevant license information to determine if unlicensed/unsupported information handling resources are installed within information handling system 102. FIGS. 2 through 5 and their accompanying text, below, detail example methods for implementing such per-system licensing scheme.

Figure 2:
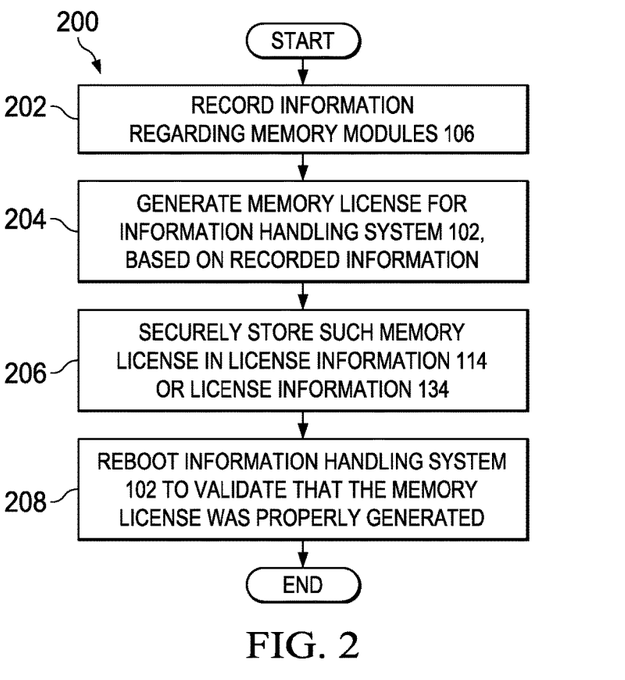
FIG. 2 illustrates a flow chart of an example method for generating a license for an information handling system during manufacturing of the information handling system, in accordance with embodiments of the present disclosure.

FIG. 2 illustrates a flow chart of an example method 200 for generating a license for information handling system 102 during manufacturing (e.g., factory configuration and testing) of information handling system 102, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

Information handling system 102 may be configured such that method 200 may only execute during a manufacturing mode of information handling system 102. Such manufacturing mode may be active during installation, manufacturing, and testing of information handling system 102, but generally not after information handling system 102 has been provided to its intended end user. Information handling system 102's existence in such manufacturing mode may be indicated by a variable or flag set in BIOS 110, and at some point during the manufacturing process, such variable or flag may be changed such that information handling system 102 does not remain in the manufacturing mode when delivered to the intended end user.

At step 202, licensing engine 116 may, for each memory module 106 present in information handling system 102, record information regarding memory modules 106. Such information may include, without limitation, a unique identifier (e.g., a serial number) of each memory module 106, a manufacturer of each memory module 106, version/revision information of each memory module 106, capacity of each memory module 106, the number of memory modules 106 present in information handling system 102, and/or other information.

At step 204, licensing engine 116 may generate a memory license for information handling system 102, wherein such memory license may include some or all of the information collected in step 202. In some embodiments, such license may be created after memory modules 106 have been fully tested and burned-in. At step 206, licensing engine 116 may securely store such memory license in license information 114, license information 134, or supported resource database 136. At step 208, information handling system 102 may reboot in order to validate that the memory license was properly generated and/or to test any particular features enabled by the license (e.g., certain advanced features may be enabled for supported memory modules 106 but not for unsupported memory modules 106). After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Figure 3:
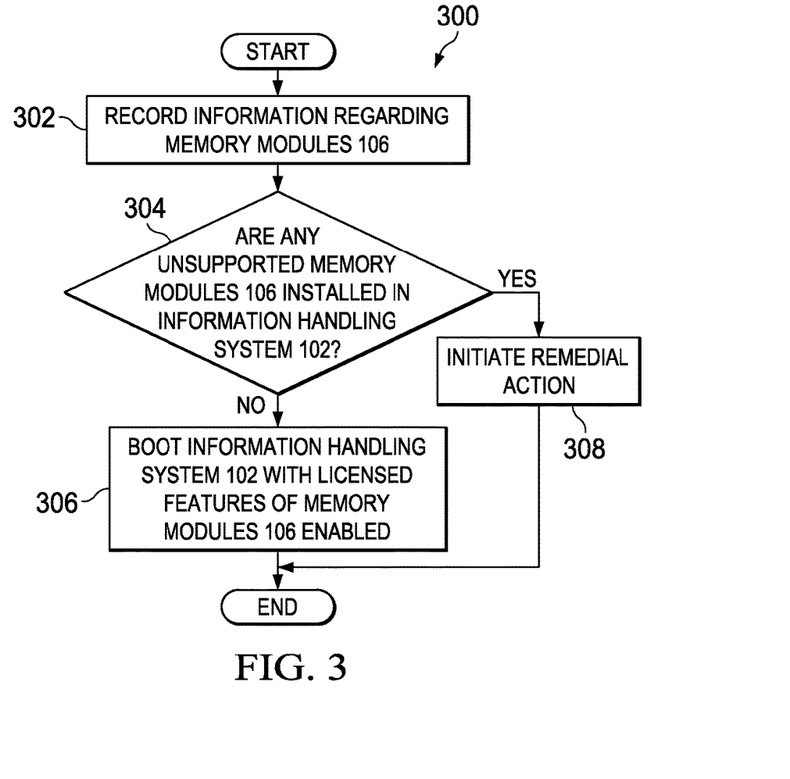
FIG. 3 illustrates a flow chart of an example method for determining whether memory modules of an information handling system are compliant with a memory license, in accordance with embodiments of the present disclosure.

FIG. 3 illustrates a flow chart of an example method 300 for determining whether memory modules 106 of an information handling system are compliant with a memory license, in accordance with embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen. Information handling system 102 may be configured such that method 300 may only execute during a boot or other initialization of information handling system 102.

At step 302, BIOS 110 may, for each memory module 106 present in information handling system 102, record information regarding memory modules 106. Such information may include, without limitation, a unique identifier (e.g., a serial number) of each memory module 106, a manufacturer of each memory module 106, version/revision information of each memory module 106, capacity of each memory module 106, the number of memory modules 106 present in information handling system 102, and/or other information.

At step 304, BIOS 110 may compare the information collected at step 302 to the memory license stored in licensing information 114 and/or licensing information 134 to determine if any unsupported memory modules 106 are installed in information handling system 102. If BIOS 110 determines that all memory modules 106 are supported in accordance with the memory license, method 300 may proceed to step 306. Otherwise, method 300 may proceed to step 308.

At step 306, responsive to a determination that all memory modules 106 are supported in accordance with the memory license, information handling system 102 may continue to boot with licensed features (e.g., advanced memory features) associated with memory modules 106 enabled. After completion of step 306, method 300 may end. For example, such licensed features may include "advanced" memory features that a provider may desire to enable on an information handling system 102 with fully-supported memory modules 106, to ensure proper and stable functionality of information handling system 102.

At step 308, responsive to a determination that one or more memory modules 106 are not supported in accordance with the memory license, BIOS 110 may take one or more remedial actions. For example, in some embodiments, BIOS 110 may cause the display to a user of a message indicating that one or more memory modules 106 are not supported. In some of such embodiments, such message may indicate which memory modules 106 are not supported. In these and other embodiments, BIOS 110 may record (e.g., to a log or other file) an indication that one or more memory modules 106 are not supported. In these and other embodiments, BIOS 110 may disable certain licensed features associated with the unsupported memory modules 106 and/or may disable certain licensed features of all memory modules 106 installed in information handling system 102. After completion of step 308, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media.

Figure 4:
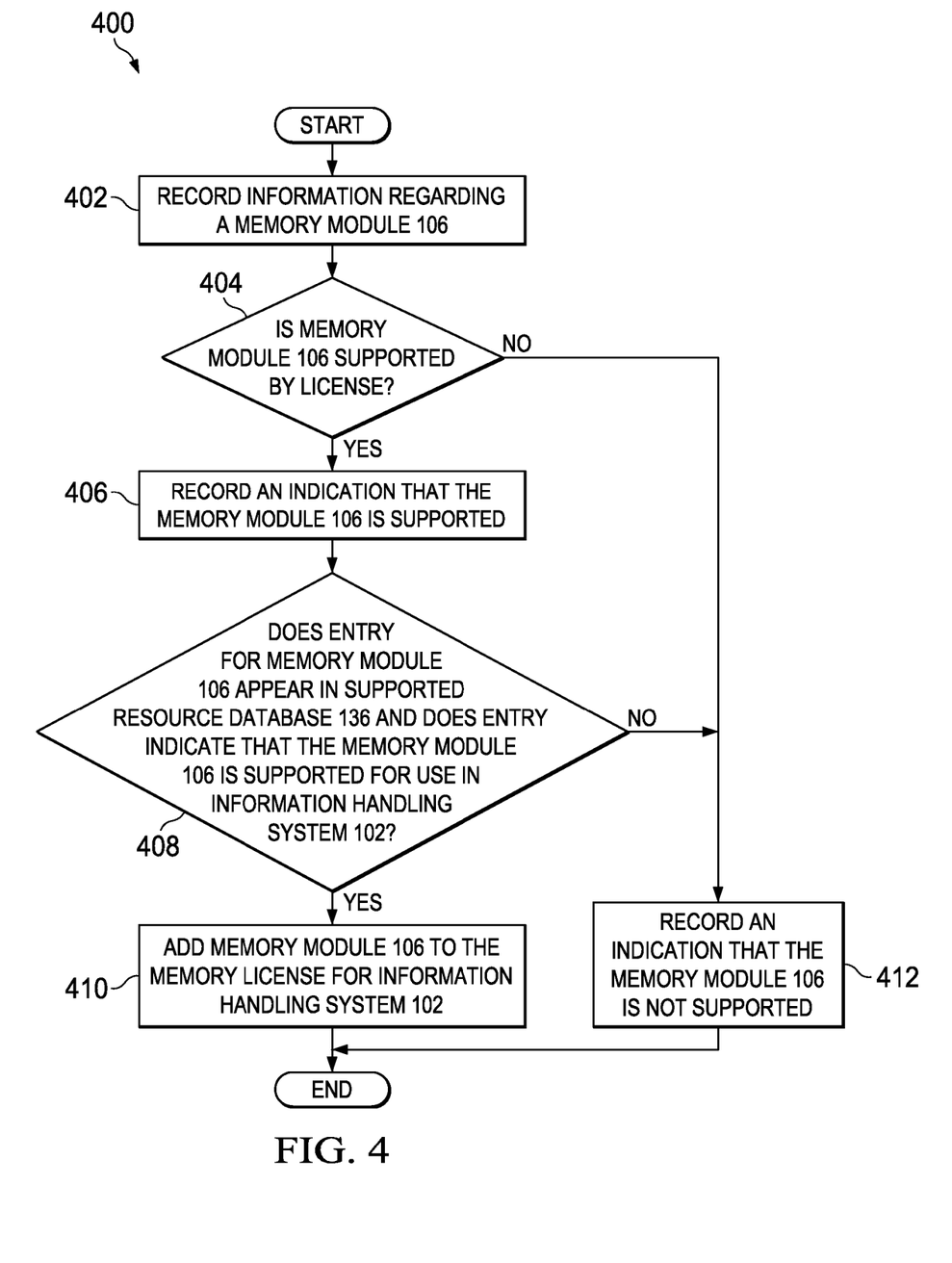
FIG. 4 illustrates a flow chart of an example method for updating a memory license, in accordance with embodiments of the present disclosure.

FIG. 4 illustrates a flow chart of an example method 400 for updating a memory license, in accordance with embodiments of the present disclosure. According to some embodiments, method 400 may begin at step 402. As noted above, teachings of the present disclosure may be implemented in a variety of configurations of system 100. As such, the preferred initialization point for method 400 and the order of the steps comprising method 400 may depend on the implementation chosen. Information handling system 102 may be configured such that method 400 may only execute during a boot or other initialization of information handling system 102. In addition, method 400 as set forth below may be executed separately for each memory module 106 installed in information handling system 102. In some embodiments, method 400 may run concurrently with or as part of method 300.

At step 402, BIOS 110 may record information regarding a memory module 106. Such information may include, without limitation, a unique identifier (e.g., a serial number) of such memory module 106, a manufacturer of such memory module 106, version/revision information of such memory module 106, capacity of such memory module 106, and/or other information.

At step 404, BIOS 110 may compare the information collected at step 402 to the memory license stored in licensing information 114 and/or licensing information 134 to determine if the memory module 106 is supported. If BIOS 110 determines that the memory module 106 is supported in accordance with the memory license, method 400 may proceed to step 406. Otherwise, method 400 may proceed to step 408.

At step 406, responsive to a determination that the memory module 106 is supported in accordance with the memory license, BIOS 110 may record an indication that the memory module is so supported. After completion of step 406, method 400 may end.

At step 408, responsive to a determination that the memory module 106 is not supported in accordance with the memory license, BIOS 110 may determine if an entry for the memory module 106 (e.g., the unique identifier for the memory module 106) appears in supported resource database 136, and if such entry indicates that the memory module 106 is supported for use in information handling system 102. If the memory module 106 has a corresponding entry in supported resource database 136 and if such entry indicates that the memory module 106 is supported for use in information handling system 102, method 400 may proceed to step 410. Otherwise, method 400 may proceed to step 412.

At step 410, responsive to a determination that the memory module 106 has a corresponding entry in supported resource database 136 and that such entry indicates that the memory module 106 is supported for use in information handling system 102, BIOS 110 may add memory module 136 to the memory license for information handling system 102. After completion of step 410, method 400 may end.

At step 412, responsive to a determination that the memory module 106 does not have a corresponding entry in supported resource database 136 or that such entry indicates that the memory module 106 is not supported for use in information handling system 102, BIOS 110 may record an indication that the memory module is not supported. After completion of step 412, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software and/or firmware embodied in computer-readable media.

License validation based on a unique identifier (e.g., serial number) of a memory module 106 provides substantial assurance that a memory module 106 is supported, as such unique identifiers are often written to a write-protected portion of a memory module 106 by a provider of the memory 106 and are not easily modified. To further provide protection against those who would attempt to reprogram memory modules 106 with fraudulent unique identifiers, additional approaches may be employed. For example, stronger protection may be possible by using memory modules 106 having a permanent write-protect for fields storing unique identifiers. Another approach is to maintain variables within supported resource database 136 or another data structure which tracks the number of information handling systems in which a memory module 106 has been validated, and algorithms may be used to flag suspicious cases and perform remedial actions in response thereto.

In some instances, it may not be possible to implement a system in which the serial numbers or other uniquely identifying fields of a memory module 106 or another information handling system are capable of being stored and updated within an information handling system license (e.g., for reasons of complexity or acceptable user experience). In such cases, the alternative embodiment discussed below with reference to FIG. 5 may be implemented. This alternative embodiment may not possess all of the advantages of the systems and methods described above, but may reduce some of the disadvantages associated with existing approaches to distinguishing unsupported information handling resources from supported information handling resources.

In this alternative embodiment, a memory license may be created in a manner similar to that described in method 200, above, but instead of storing unique identifiers for the various memory modules 106, an information handling system license may include the memory capacity of the system and/or the number of memory modules 106 installed during manufacturing of the information handling system. For example, if a customer purchases an information handling system with eight memory modules 106 each having 16 GB of capacity, the information handling system license may include an entry indicating that 128 GB of memory is licensed and/or that eight memory modules 106 are licensed.

Figure 5:
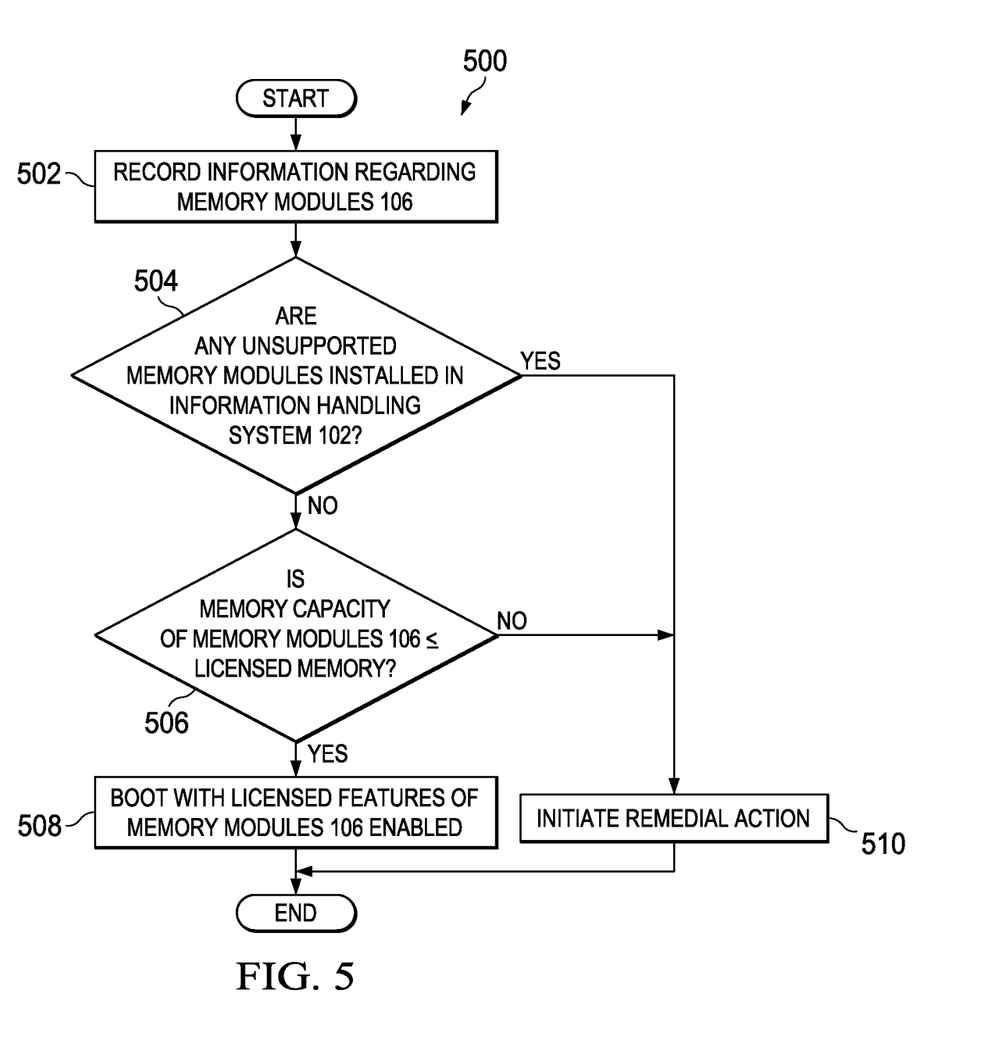
FIG. 5 illustrates a flow chart of another example method for determining whether memory modules of an information handling system are compliant with a memory license, in accordance with embodiments of the present disclosure.

FIG. 5 illustrates a flow chart of another example method 500 for determining whether memory modules 106 of an information handling system are compliant with a memory license, in accordance with embodiments of the present disclosure. According to some embodiments, method 500 may begin at step 502. As noted above, teachings of the present disclosure may be implemented in a variety of configurations of system 100. As such, the preferred initialization point for method 500 and the order of the steps comprising method 500 may depend on the implementation chosen. Information handling system 102 may be configured such that method 500 may only execute during a boot or other initialization of information handling system 102.

At step 502, BIOS 110 may, for each memory module 106 present in information handling system 102, record information regarding memory modules 106. Such information may include, without limitation, a manufacturer of each memory module 106, version/revision information of each memory module 106, capacity of each memory module 106, the number of memory modules 106 present in information handling system 102, and/or other information.

At step 504, BIOS 110 may compare the information collected at step 502 to blacklists and/or whitelists which may be stored in licensing information 114, licensing information 134, supported resource database 136, or elsewhere to determine if any unsupported memory modules 506 are installed in information handling system 102. For example, such comparisons may include comparing a manufacturer identity, device type, and/or version/revision number of a memory module 106 to entries in such whitelist or blacklist. If BIOS 110 determines that all memory modules 106 are supported in accordance with the memory license, method 500 may proceed to step 506. Otherwise, method 500 may proceed to step 510.

At step 506, responsive to a determination that all memory modules 106 are supported in accordance with the memory license, BIOS 110 may compare the total memory capacity of memory modules 106 to the licensed memory capacity for information handling system 102. If the total memory capacity of memory modules 106 is less than or equal to the licensed memory capacity, method 500 may proceed to step 508. Otherwise, method 500 may proceed to step 510.

At step 508, responsive to a determination that the total memory capacity of memory modules 106 is less than or equal to the licensed memory capacity, information handling system 102 may continue to boot with licensed features (e.g., advanced memory features) associated with memory modules 106 enabled. After completion of step 508, method 500 may end.

At step 510, responsive to a determination that one or more memory modules 106 are not supported in accordance with the memory license or that the capacity of memory modules 106 exceeds the licensed memory capacity, BIOS 110 may take one or more remedial actions. For example, in some embodiments, BIOS 110 may cause the display to a user of a message indicating that one or more memory modules 106 are not supported. In some of such embodiments, such message may indicate which memory modules 106 are not supported. In these and other embodiments, BIOS 110 may record (e.g., to a log or other file) an indication that one or more memory modules 106 are not supported. In these and other embodiments, BIOS 110 may disable certain licensed features associated with the unsupported memory modules 106 and/or may disable certain licensed features of all memory modules 106 installed in information handling system 102. For example, in some embodiments, BIOS 110 may limit the user available memory capacity to the licensed memory capacity. After completion of step 510, method 500 may end.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using system 100 or any other system operable to implement method 500. In certain embodiments, method 500 may be implemented partially or fully in software and/or firmware embodied in computer-readable media.

For cases in which an end user upgrades memory modules 106 after sale or factory configuration, in which the total capacity and/or the number of memory modules 106 increases, the memory license may need to be updated to reflect the new configuration. In some embodiments, a system utility may be used to update the memory license (e.g., which may be associated with a unique identifier of the information handling system) and the new license may be downloaded to the information handling system and stored within licensing information 114. In other embodiments, a service technician or an administrator with appropriate credentials, with knowledge that the memory modules 106 are supported by the provider of the information handling system, might be given access to a provider-provided utility that may be executed to update the memory license.

Although the foregoing discussion has set forth methods and systems for distinguishing between unsupported memory modules and supported memory modules present in an information handling system, similar or analogous methods and systems may be applied generally to any type of information handling resource present in an information handling system.

The methods and systems herein, in addition to detecting if unsupported memory modules or other information handling resources are present in an information handling system and taking remedial action in the presence of unsupported information handling resources, may also be useful in mining and collecting data regarding information handling systems, which a provider of information handling systems may use for various purposes. For example, such methods and systems may be modified to allow collection of data to enable a provider of information handling systems to build statistics regarding the prevalence of unsupported information handling resources in use, collect pertinent information regarding an information handling resource in connection with a service call or warranty repair, and/or other purposes.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   at least one information handling resource communicatively coupled to the processor, wherein the at least one information handling resource is a hardware information handling resource; and
   a basic input/output system (BIOS) comprising a program of instructions executable by the processor and configured to cause the processor to initialize one or more information handling resources of the information handling system, wherein the BIOS is configured to:
   record information regarding the at least one information handling resource, wherein the information identifies a manufacturer of the at least one information handling resource;
   compare the information to a license for the information handling system to determine if the at least one information handling resource is supported by a provider of the information handling system;
   compare the manufacturer to a whitelist and/or a blacklist of manufacturers to determine that the manufacturer is an unsupported manufacturer; and
   responsive to determining that the information handling system is unsupported by the provider based on the manufacturer being the unsupported manufacturer, initiate a remedial action with respect to at least one information handling resource to improve stability of the information handling system to a greater stability level than would be present in the absence of the remedial action, wherein the remedial action includes disabling the at least one information handling resource from being used by the information handling system such that the information handling system is configured to continue functioning without using the at least one information handling resource.

2. The information handling system of claim 1, wherein the remedial action further comprises at least one of:
   displaying an alert indicating that the at least one information handling resource is unsupported; and
   recording an indication that the at least one information handling resource is unsupported.

3. The information handling system of claim 1, wherein the BIOS is further configured to enable one or more operational features associated with the at least one information handling resource responsive to determining that the at least one information handling resource is supported by the provider.

4. The information handling system of claim 1, wherein the information comprises a unique identifier of the at least one information handling resource, and comparing the information to the license comprises comparing the unique identifier to a list of one or more unique identifiers set forth in the license.

5. The information handling system of claim 1, wherein the at least one information handling resource comprises at least one memory module.

6. The information handling system of claim 5, wherein the information comprises a memory capacity of the at least one memory module and comparing the information to the license comprises comparing the memory capacity to a licensed memory capacity set forth in the license.

7. The information handling system of claim 6, wherein the information further comprises a number of memory modules comprising the at least one memory module and comparing the information to the license comprises comparing the number of memory modules to a licensed number of memory modules set forth in the license.

8. A method comprising:
   recording information regarding at least one information handling resource present in an information handling system, wherein the at least one information handling resource is a hardware information handling resource, and wherein the information identifies a manufacturer of the at least one information handling resource;
   comparing the information to a license for the information handling system to determine if the at least one information handling resource is supported by a provider of the information handling system;

comparing the manufacturer to a whitelist and/or a blacklist of manufacturers to determine that the manufacturer is an unsupported manufacturer; and responsive to determining that the information handling system is unsupported by the provider based on the manufacturer being the unsupported manufacturer, initiating a remedial action with respect to at least one information handling resource to improve stability of the information handling system to a greater stability level than would be present in the absence of the remedial action, wherein the remedial action includes disabling the at least one information handling resource from being used by the information handling system such that the information handling system continues functioning without using the at least one information handling resource.

9. The method of claim 8, wherein the remedial action further comprises at least one of:
displaying an alert indicating that the at least one information handling resource is unsupported; and
recording an indication that the at least one information handling resource is unsupported.

10. The method of claim 8, further comprising enabling one or more operational features associated with the at least one information handling resource responsive to determining that the at least one information handling resource is supported by the provider.

11. The method of claim 8, wherein the information comprises a unique identifier of the at least one information handling resource, and comparing the information to the license comprises comparing the unique identifier to a list of one or more unique identifiers set forth in the license.

12. The method of claim 8, wherein the at least one information handling resource comprises at least one memory module.

13. The method of claim 12, wherein the information comprises a memory capacity of the at least one memory module and comparing the information to the license comprises comparing the memory capacity to a licensed memory capacity set forth in the license.

14. The method of claim 13, wherein the information further comprises a number of memory modules comprising the at least one memory module and comparing the information to the license comprises comparing the number of memory modules to a licensed number of memory modules set forth in the license.

15. An article of manufacture comprising:
a non-transitory computer readable medium; and
computer-executable instructions carried on the computer readable medium, the instructions readable by a processor, the instructions, when read and executed, for causing the processor to:
record information regarding at least one information handling resource present in an information handling system, wherein the at least one information handling resource is a hardware information handling resource, and wherein the information identifies a manufacturer of the at least one information handling resource;
compare the information to a license for the information handling system to determine if the at least one information handling resource is supported by a provider of the information handling system;
compare the manufacturer to a whitelist and/or a blacklist of manufacturers to determine that the manufacturer is an unsupported manufacturer; and
responsive to determining that the information handling system is unsupported by the provider based on the manufacturer being the unsupported manufacturer, initiate a remedial action with respect to at least one information handling resource to improve stability of the information handling system to a greater stability level than would be present in the absence of the remedial action, wherein the remedial action includes disabling the at least one information handling resource from being used by the information handling system such that the information handling system is configured to continue functioning without using the at least one information handling resource.

16. The article of claim 15, wherein the remedial action further comprises at least one of:
displaying an alert indicating that the at least one information handling resource is unsupported; and
recording an indication that the at least one information handling resource is unsupported.

17. The article of claim 15, the instructions for further causing the processor to enable one or more operational features associated with the at least one information handling resource responsive to determining that the at least one information handling resource is supported by the provider.

18. The article of claim 15, wherein the information comprises a unique identifier of the at least one information handling resource, and comparing the information to the license comprises comparing the unique identifier to a list of one or more unique identifiers set forth in the license.

19. The article of claim 15, wherein the at least one information handling resource comprises at least one memory module.

20. The article of claim 19, wherein the information comprises a memory capacity of the at least one memory module and comparing the information to the license comprises comparing the memory capacity to a licensed memory capacity set forth in the license.

21. The article of claim 20, wherein the information further comprises a number of memory modules comprising the at least one memory module and comparing the information to the license comprises comparing the number of memory modules to a licensed number of memory modules set forth in the license.

* * * * *